United States Patent [19]

Schramm et al.

[11] Patent Number: 5,313,490

[45] Date of Patent: May 17, 1994

[54] ACQUISITION APPARATUS FOR DSSS COMMUNICATIONS

[75] Inventors: Karen M. Schramm, Needham; William E. DeLisle, Milford; John W. Lovell, Sherborn, all of Mass.

[73] Assignee: GTE Government Systems Corporation, Waltham, Mass.

[21] Appl. No.: 999,643

[22] Filed: Dec. 31, 1992

[51] Int. Cl.⁵ .......................................... H04L 27/30
[52] U.S. Cl. ................................... 375/1; 380/34; 455/65
[58] Field of Search .................. 375/1, 87; 380/34; 342/357; 455/65

[56] References Cited

U.S. PATENT DOCUMENTS

| | | | |
|---|---|---|---|
| 4,112,372 | 9/1978 | Holmes et al. | 375/1 |
| 4,457,006 | 6/1984 | Maine | 375/87 |
| 4,652,884 | 3/1987 | Starker | 342/357 |
| 4,754,465 | 6/1988 | Trimble | 375/1 |
| 4,847,862 | 7/1989 | Braisted et al. | 375/1 |
| 4,932,036 | 6/1990 | Goradia et al. | 375/1 |
| 4,943,974 | 7/1990 | Motamedi | 375/1 |
| 5,093,839 | 3/1992 | Kohno et al. | 375/1 |
| 5,148,179 | 9/1992 | Allison | 342/357 |

Primary Examiner—Bernarr E. Gregory
Attorney, Agent, or Firm—J. Stephen Yeo

[57] ABSTRACT

Apparatus for indicating the end of an acquisition procedure between a transmitter and receiver in a direct sequence spread spectrum communications system. A transmitter generates a first acquisition code having a first acquisition code period and comprised of digital bits at a first bit rate. A circuit modulates the first digital acquisition code by a pseudo-noise code repeating at a pseudo-noise code period and consisting of a sequence of chips at a chip rate greater than the first bit rate. The first acquisition code period is an integer multiple of the pseudo-noise code period. A circuit modulates a carrier by the first digital acquisition code modulated by the pseudo-noise code. The carrier modulated by said first digital acquisition code modulated by said pseudo-noise code is transmitted for a first period of time. A circuit synchronizes a receiver to the chip rate and carrier frequency. A circuit synchronizes the receiver to the pseudo-noise code period. A circuit synchronizes the receiver to the period of the data bit rate. A circuit synchronizes the receiver to the first acquisition code period. The transmitter generates a second acquisition code having a second acquisition code period and comprised of digital bits at a second bit rate, the second bit rate equal to the bit rate of the first acquisition code period. A circuit modulates the second digital acquisition code by the pseudo-noise code. A circuit modulates the carrier by the second digital acquisition code modulated by the pseudo-noise code. A circuit transmits for a second period of time equal to the second acquisition code period the carrier modulated by the second acquisition code modulated by the pseudo-noise code. A circuit synchronizes the receiver to the second acquisition code, the end of the second acquisition code indicates the end of the acquisition procedure.

2 Claims, 5 Drawing Sheets

FIG. I

ACQUISITION PROCEDURE

TRANSMITTER PROCEDURE

① TRANSMIT FOR A FIRST TIME PERIOD REPETITIVE CODE PERIODS OF A FIRST DATA CODE HAVING GOOD AUTOCORRELATION PROPERTIES (AQUISITION CODE) MODULATED BY A SHORT PN

② TRANSMIT FOR A SECOND TIME PERIOD ONE CODE PERIOD OF A SECOND DATE CODE HAVING GOOD AUTOCORRELATION PROPERTIES MODULATED BY SHORT PN CODE, THE CODE PERIOD OF THE SECOND DATA CODE EQUAL TO THE BIT PERIOD OF THE FIRST DATA CODE

③ TRANSFER TO A LONG PN CODE

RECEIVER PROCEDURE

① DETECT SIGNAL: CORRELATE ON SHORT PN CODE (PN TIMING AND CARRIER FREQUENCY)

② SYNCHRONIZE TO BIT TIMING

③ SYNCHRONIZE TO FIRST DATA CODE

④ SEARCH FOR SECOND DATA CODE

⑤ DETECT SECOND DATA CODE · IDENTIFY TIME MARK

⑥ TRANSFER TO LONG PN CODE

FIG. 5

ACQUISITION APPARATUS FOR DSSS COMMUNICATIONS

CROSS REFERENCE TO RELATED APPLICATIONS

This application contains subject matter related to matter disclosed and claimed in commonly assigned, copending U.S. patent application Ser. Nos.: 07/999,033, filed Dec. 31, 1992; 07/999,040, filed Dec. 31, 1992; 07/999,242, filed Dec. 31, 1992; 07/999,503, filed Dec. 31, 1992; 07/999,505, filed Dec. 31, 1992; 07/999,507, filed Dec. 31, 1992; and U.S. patent application Ser. No. 07/999,625, filed Dec. 31, 1992, now U.S. Pat. No. 5,291,517.

BACKGROUND OF THE INVENTION

This invention relates to communication systems, and in particular to direct sequence spread spectrum (DSSS) communications systems.

In a direct sequence spread spectrum communication system, digital data comprised of data bits is modulated by a pseudo-noise code comprised of a sequence of chips, the pseudo-noise chip rate greater than the data bit rate, each chip having a chip period, the sequence repeating at a code period, and the pseudo-noise modulated data modulates a carrier frequency resulting in a signal.

SUMMARY OF THE INVENTION

Briefly, according to one aspect of the invention, there is provided a transmitter provided with a first acquisition code having a first acquisition code period and comprised of digital bits at a first bit rate. The first digital acquisition code is modulated by a pseudo-noise code repeating at a pseudo-noise code period and consisting of a sequence of chips at a chip rate greater than the first bit rate. The first acquisition code period is an integer multiple of the pseudo-noise code period. A carrier frequency is modulated by the first digital acquisition code modulated by the pseudo-noise code and transmitted for a first period of time. A receiver is sequentially synchronized to the chip rate and carrier frequency, the pseudo-noise code period, the period of the data bit rate, and to the first acquisition code period. During a second period of time, the transmitter provides a second acquisition code having a second acquisition code period and comprised of digital bits at a second bit rate, the second bit rate equal to the first acquisition code period, modulates the second digital acquisition code by the pseudo-noise code. The carrier frequency is modulated by the second digital acquisition code modulated by the pseudo-noise code: and transmitted for a second period of time equal to the second acquisition code period. The receiver is then synchronized to the second acquisition code. The end of the second acquisition code represents a time mark.

BRIEF DESCRIPTION OF THE DRAWINGS

FIG. 5 diagrams obtaining a time mark between transmitter and receiver.

DETAILED DESCRIPTION OF THE PREFERRED EMBODIMENTS

Figure 1:
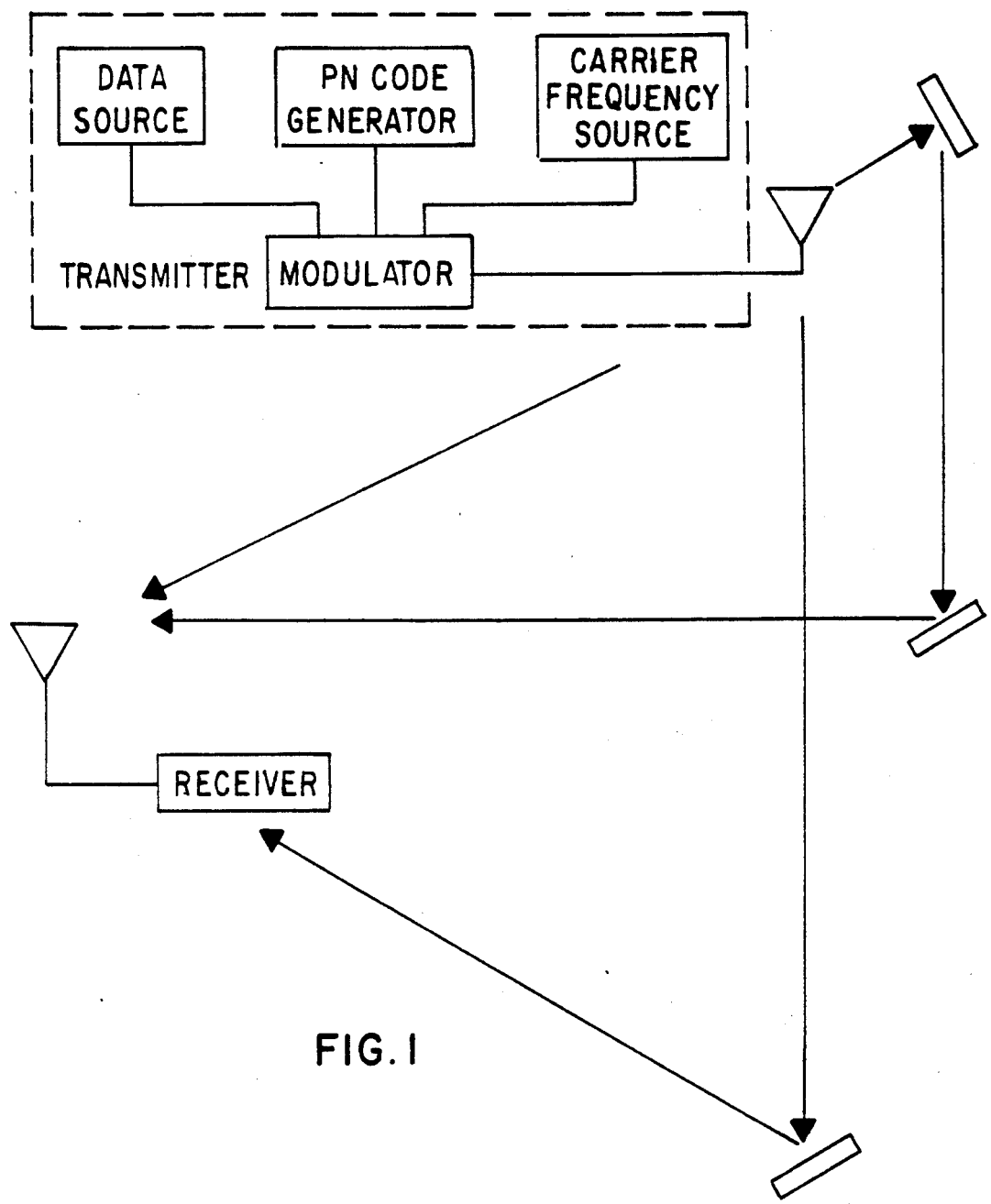
FIG. 1 shows direct sequence spread spectrum (DSSS) communications system including a radio transmitter and a receiver.

FIG. 1 shows direct sequence spread spectrum (DSSS) communications system including a radio transmitter and a receiver. The transmitter includes a modulator wherein digital data comprised of data bits is modulated by a pseudo-noise code comprised of a sequence of chips, the pseudo-noise chip rate greater than the data bit rate, each chip having a chip period, the sequence repeating at a code period, and the pseudo-noise modulated data modulates a carrier frequency resulting in a signal. The signal from the transmitter is propagated over a transmission path to the receiver.

Figure 2:
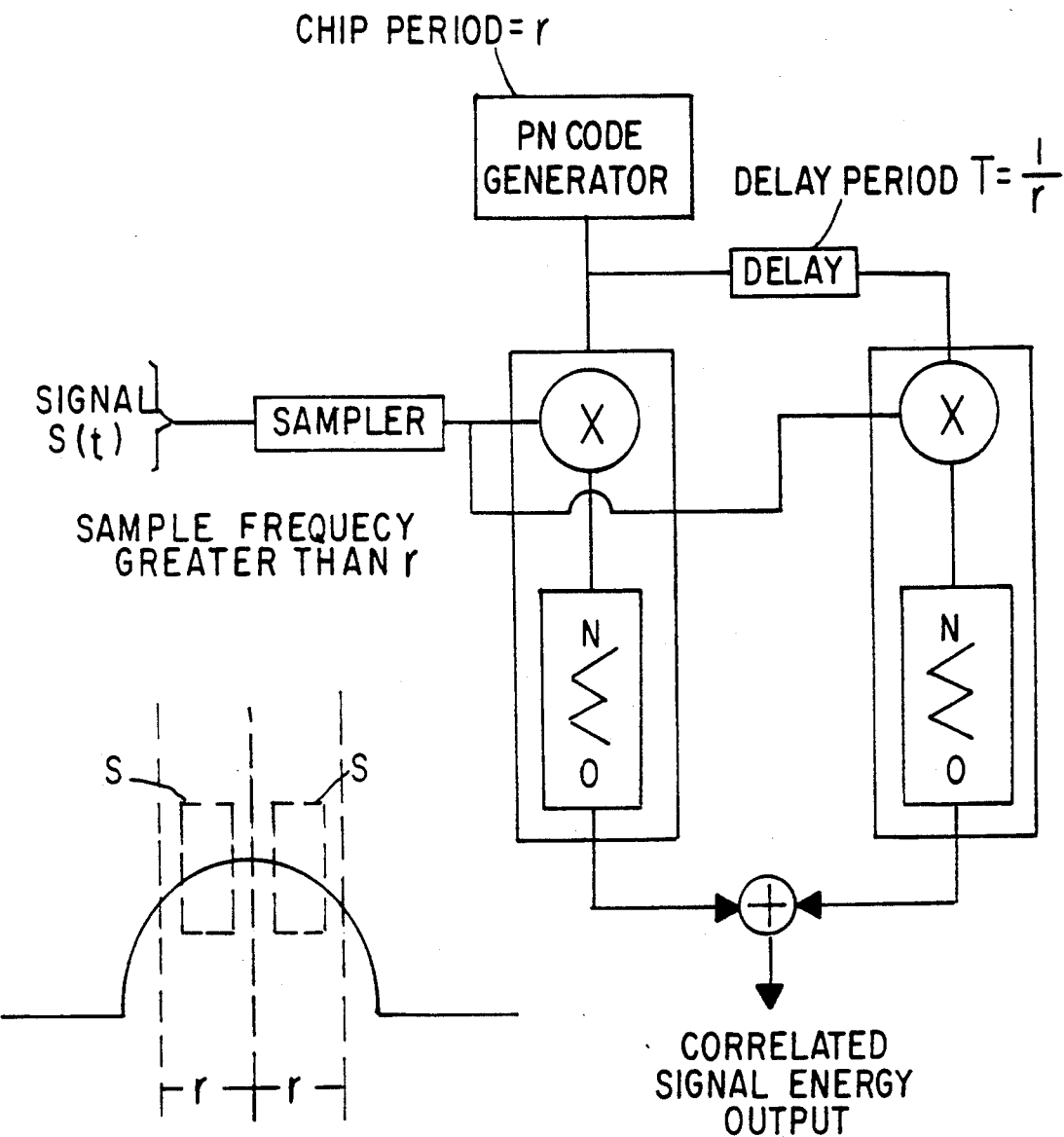
FIG. 2 shows a dual chip correlator used in the receiver.

The receiver includes at least one correlator for processing the direct sequence spread spectrum signal. A specific correlator is shown in FIG. 2. A sampler is adapted to produce digital samples of the signal. A pseudo-noise code generator provides a second pseudo-noise code replicating the first pseudo-noise code. A first multiplier is coupled to the pseudo-noise code generator and coupled to the sampler to provide a first output representing a first correlation of the sampled signal and the second pseudo-noise code. A second multiplier is coupled to the pseudo-noise code generator through a time delay equivalent to one chip period and coupled to the sampler to provide a second output, the second output representing a second correlation of the sampled signal and the second pseudo-noise code delayed by one chip period. A first integrator is coupled to the output of the first multiplier for integrating the output from the first multiplier to provide at an output a first correlated signal energy value representing signal energy of the first correlation. A second integrator is coupled to the output of the second multiplier for integrating the output from the second correlator to provide at an output a second correlated signal energy value representing signal energy of the second correlation. A combiner is coupled to the outputs of the first and second integrators for combining first and second correlated signal energy values to obtain the combined value of correlated signal energy from the first and second integrators. A synchronizer is coupled to the combiner for time synchronizing the second pseudo-noise code to the first pseudo-noise code to maximize the value of correlated signal energy thereby time locking the first pseudo-noise code and the second pseudo-noise code.

The correlator uses the following method. Digital samples are made of the signal. A second pseudo-noise code replicates the first pseudo-noise code. A first correlation is made of the sampled signal and the second pseudo-noise code. A second correlation is made of the sampled signal and the second pseudo-noise code delayed by one chip period. A first correlated signal energy value represents the signal energy of the first correlation. A second correlated signal energy value represents the signal energy of the second correlation. The first and second correlated signal energy values are combined to obtain the combined value of correlated signal energy. The second pseudo-noise code is time synchronized to maximize the combined value of correlated signal energy, thereby time locking the first pseudo-noise code and the second pseudo-noise code.

A multipath signal includes a plurality of out of phase signal components, seen in FIG. 1, which result from multipath reception. A sum of phase corrected multipath signal components provides a composite received signal. The transmitter modulator s code repetition period is equal or greater in time to the expected received time span of multipath signal components.

Figure 3:
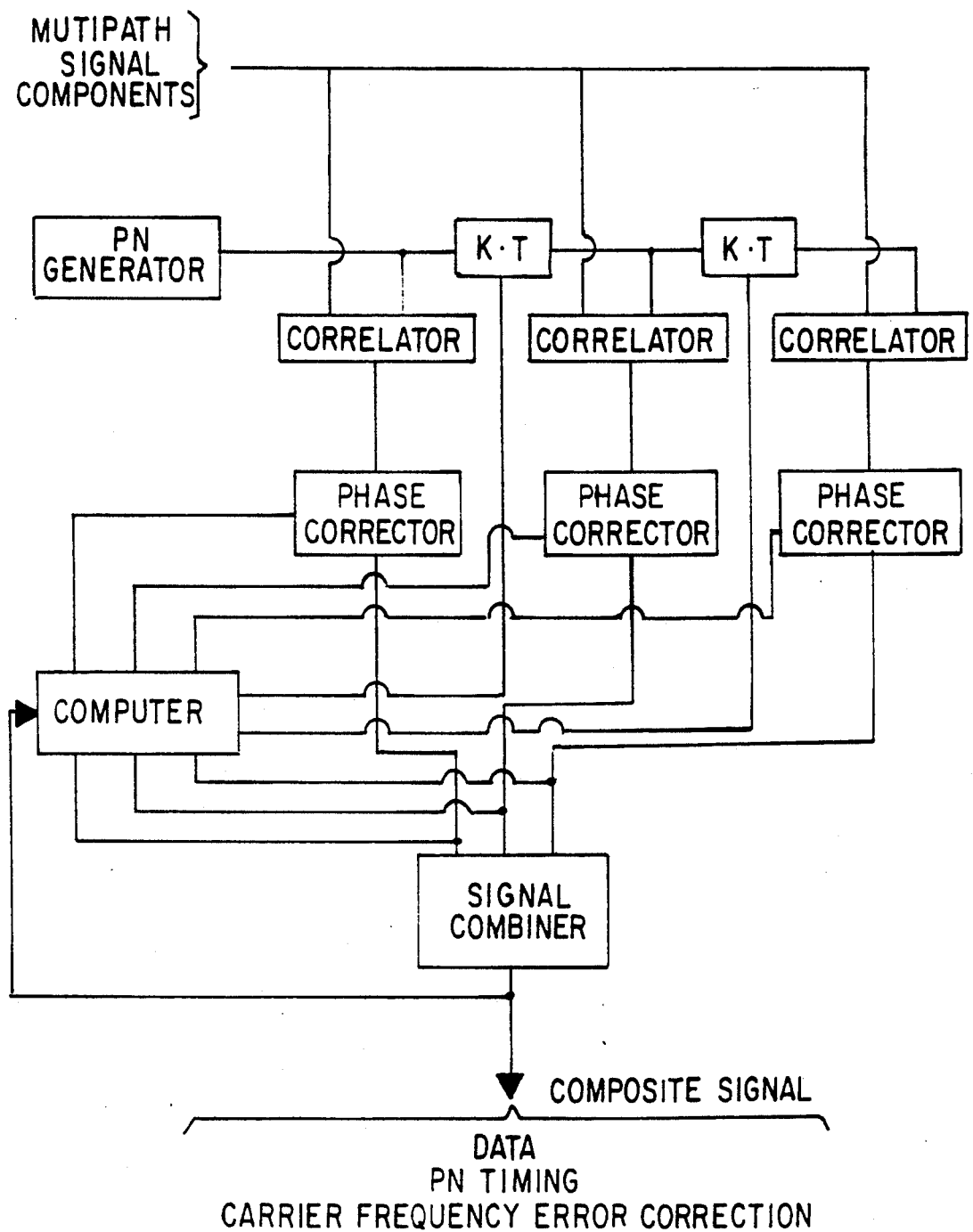
FIG. 3 shows a receiver adapted for multipath reception.

The receiver, seen in FIG. 3, is adapted to receive multipath signal components, and includes a plurality of correlators. A pseudo-noise code generator duplicates the pseudo-noise code with chip rate and code repetition period equal to that of the modulator.

A corresponding time delayer is coupled between each correlator and the pseudo-noise code generator, providing time increments of a time offset, each time increment being equal to a chip duration or less, providing a total time offset equal to the code repetition period allowing correlation with all received signal components.

A computer is programmed to cause said receiver to test all of the time increments for detecting the presence of a first signal component of predefined signal strength and assigning a correlator to said first signal component for synchronizing the receiver. The computer is programmed to cause the receiver to continue searching for and recording the strength of the signal component at each timing increment. The computer is also programmed for analyzing the recorded signal strengths and selecting those that would optimize a composite received signal. The computer assigns the remaining correlators to the selected signal components.

A phase correcting device at the output of each of the correlators adjusts for differences in the carrier phase of each signal component and a signal combiner sums the phase corrected signal components to provide a composite received signal.

A correlator is adapted to periodically scan the received signal components to identify high energy signal components and reassign correlators in response to changing signal conditions.

The time delayer may be a tapped delay line. A tap selector selects the time delay from the pseudo-noise code generator to a corresponding correlator, which is assigned to a corresponding signal component.

The method provides a plurality of correlators. The period of expected time uncertainty is scanned to identify the highest energy signal components. Each correlator is assigned to process one of the highest energy signal components. Each of the correlator outputs is pase corrected to compensate for carrier phase differences. The correlator outputs are coherently combined to provide a data output.

The actual transmitted carrier frequency consists of an expected carrier frequency and a carrier frequency error.

Figure 4:
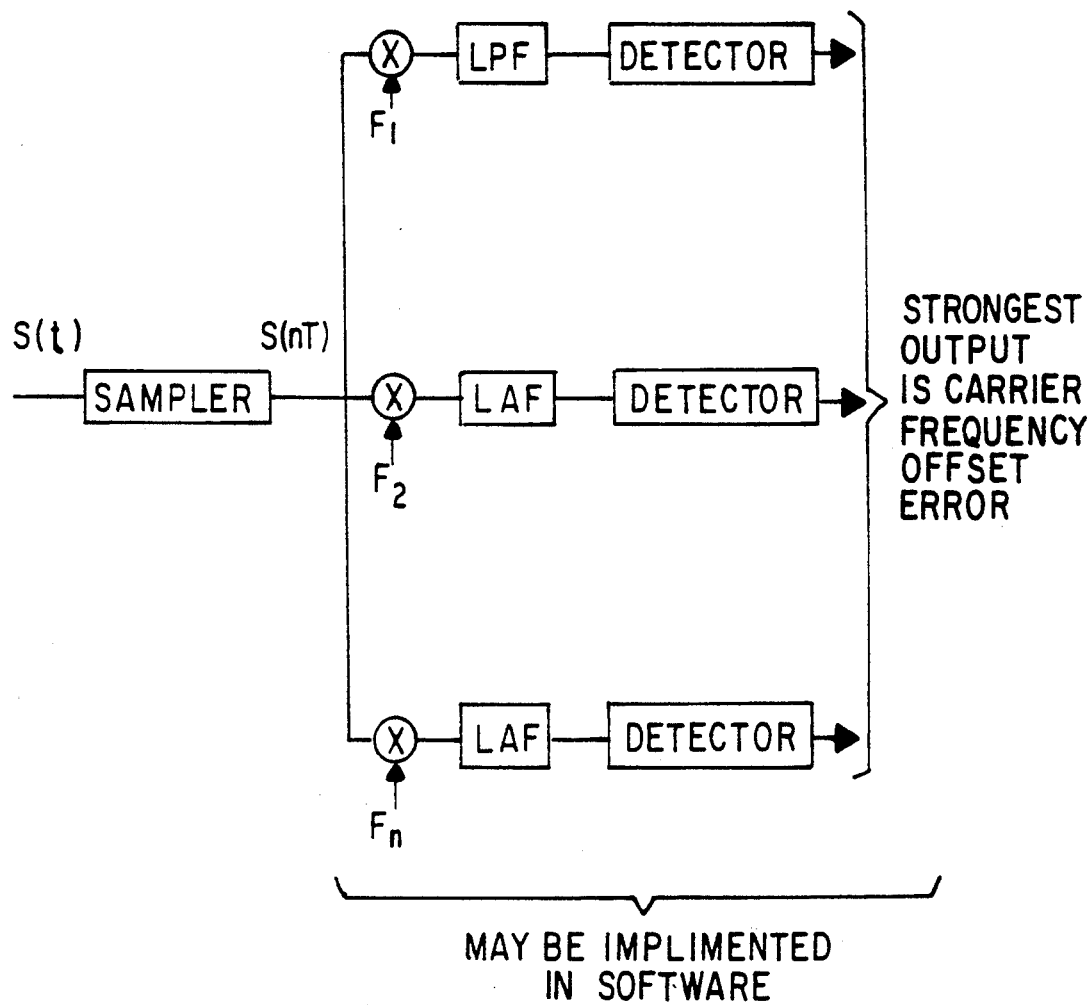
FIG. 4 illustrates a corrector for carrier frequency error.

FIG. 4 shows a carrier frequency corrector within the receiver. A local frequency source provides a local frequency approximately equal to equal to the expected carrier frequency. A demodulator provides complex demodulated received signals stripped of the pseudo-noise code and mixed with the local frequency source. Each of the demodulated signals consists of in-phase signal components and quadrature signal components and the carrier frequency error. A sampler is coupled to the demodulator and converts the demodulated signal components to digital samples. A digital signal processor is coupled to the sampler multiplies each signal component sample by stored digitized samples of a plurality of closely spaced sinusoidal tones to provide a product corresponding to each tone. The processor squares each product and compares the squared products to determine which tone provides the maximum value. That tone corresponds to the carrier frequency error. An adjuster between the digital signal processor and the local frequency source adjusts the local frequency source to compensate for the carrier frequency error for providing a local frequency equal to the received carrier frequency.

As a method, there is provided a local frequency equal to the expected carrier frequency. Demodulated received signals are stripped of the pseudo-noise code and mixed with the local frequency. The demodulated signals consist of in-phase signal components and quadrature signal components and the carrier frequency error. The demodulated signal components are converted to digital samples which are multiplied by stored digitized samples of a plurality of closely spaced sinusoidal tones to provide a product corresponding to each tone. Each product is squared. The squared products are compared to determine which tone provides the maximum value, that tone corresponding to the carrier frequency error. The local frequency is adjusted to compensate for the carrier frequency error so that the local frequency is made equal to the received carrier frequency.

Referring to FIG. 5, provision is made to provide a time mark between transmitter and receiver. The transmitter is provided with a first acquisition code having a first acquisition code period and comprised of digital bits at a first bit rate. The first digital acquisition code is modulated by a pseudo-noise code repeating at a pseudo-noise code period and consisting of a sequence of chips at a chip rate greater than the first bit rate. The first acquisition code period is an integer multiple of the pseudo-noise code period. A carrier frequency is modulated by the first digital acquisition code modulated by the pseudo-noise code and transmitted for a first period of time. A receiver is sequentially synchronized to the chip rate and carrier frequency, the pseudo-noise code period, the period of the data bit rate, and to the first acquisition code period. During a second period of time, the transmitter provides a second acquisition code having a second acquisition code period and comprised of digital bits at a second bit rate, the second bit rate equal to the first acquisition code period, modulates the second digital acquisition code by the pseudo-noise code. The carrier frequency is modulated by the second digital acquisition code modulated by the pseudo-noise code; and transmitted for a second period of time equal to the second acquisition code period. The receiver is then synchronized to the second acquisition code. The end of the second acquisition code represents a time mark.

Upon the time mark, digital data may be modulated by a second pseudo-noise code upon the time mark.

As a method, there is provided a first acquisition code having a first acquisition code period and comprised of digital bits at a first bit rate, modulating the first digital acquisition code by a pseudo-noise code repeating at a pseudo-noise code period and consisting of a sequence of chips at a chip rate greater than the first bit rate, and wherein the first acquisition code period is an integer multiple of the pseudo-noise code period. A carrier frequency is modulated by the first digital acquisition code modulated by the pseudo-noise code. The carrier modulated by the first digital acquisition code modulated by the pseudo-noise code is transmitted for a first period of time. A receiver is synchronized to the chip rate and carrier frequency, then to the pseudo-noise code period, next to the period of the data bit rate, and then to the first acquisition code period. A second acquisition code is provided having a second acquisition code period and comprised of digital bits at a second bit rate. The second bit rate is equal to the first acquisition code period. The second digital acquisition code is modulated by the pseudo-noise code. The carrier frequency is modulated by the second digital acquisition code modulated by the pseudo-noise code. The carrier modulated by the second acquisition code modulated by the pseudo-noise code is transmitted for a second period of time equal to the second acquisition code period. The receiver is synchronized to the second acquisition code. The end of the second acquisition code represents a time mark.

The method may further include the step of modulating digital data by a second pseudo-noise code upon the time mark.

The preferred embodiments of the invention have been used as examples. The best mode of practicing the invention has been described. In light of this disclosure, various modifications will be apparent to those skilled in the art. Accordingly, the scope of the invention is to be determined by the following claims.

What is claimed is:

1. Apparatus for indicating the end of an acquisition procedure between a transmitter and receiver in a direct sequence spread spectrum communications system, comprising:

a transmitter;

means for generating at said transmitter a first acquisition code having a first acquisition code period and comprised of digital bits at a first bit rate;

means for modulating said first digital acquisition code by a pseudo-noise code repeating at a pseudo-noise code period and consisting of a sequence of chips at a chip rate greater than said first bit rate, and wherein said first acquisition code period is an integer multiple of said pseudo-noise code period;

means for modulating a carrier by said first digital acquisition code modulated by said pseudo-noise code;

means for transmitting for a first period of time, said carrier modulated by said first digital acquisition code modulated by said pseudo-noise code;

a receiver;

means for synchronizing a receiver to said chip rate and carrier frequency;

means for synchronizing said receiver to said pseudo-noise code period;

means for synchronizing said receiver to said period of said data bit rate;

means for synchronizing said receiver to said first acquisition code period;

means for generating at said transmitter a second acquisition code having a second acquisition code period and comprised of digital bits at a second bit rate, said second bit rate equal to the bit rate of said first acquisition code period;

means for modulating said second digital acquisition code by said pseudo-noise code;

means for modulating said carrier by said second digital acquisition code modulated by said pseudo-noise code;

means for transmitting for a second period of time equal to said second acquisition code period said carrier modulated by said second acquisition code modulated by said pseudo-noise code; and means for synchronizing said receiver to said second acquisition code, the end of said second acquisition code indicating the end of said acquisition procedure.

2. The apparatus of claim 1 which further includes means for modulating digital data by a second pseudo-noise code upon the end of said acquisition procedure.

* * * * *